US005718442A

United States Patent [19]

Alexander et al.

[11] Patent Number: 5,718,442

[45] Date of Patent: Feb. 17, 1998

[54] POWER WHEELCHAIR WITH EXTENDED POWER SEAT FRAME TILT

[75] Inventors: Dalva R. Alexander, Houston; Rucker Ashmore, Austin, both of Tex.

[73] Assignee: Mechanical Application Designs, Inc., Katy, Tex.

[21] Appl. No.: 579,150

[22] Filed: Dec. 27, 1995

[51] Int. Cl.[6] .......... B60K 1/02

[52] U.S. Cl. .......... 280/250.1; 280/304.1

[58] Field of Search .......... 280/250.1, 304.1; 297/DIG. 4

[56] References Cited

U.S. PATENT DOCUMENTS

| | | | |
|---|---|---|---|
| 4,759,561 | 7/1988 | Janssen | 280/242 WC |
| 4,966,379 | 10/1990 | Mulholland | 280/242.1 |
| 4,972,351 | 11/1990 | Reger et al. | 364/468 |
| 5,033,000 | 7/1991 | Littlejohn et al. | 364/424.05 |
| 5,044,647 | 9/1991 | Patterson | 280/250.1 |
| 5,123,495 | 6/1992 | Littlejohn et al. | 180/9.32 |
| 5,294,141 | 3/1994 | Mentessi et al. | 280/250.1 |
| 5,531,284 | 7/1996 | Okamoto | 180/65.1 |
| 5,540,297 | 7/1996 | Meier | 180/65.5 |
| 5,542,690 | 8/1996 | Kozicki | 280/304.1 |
| 5,549,357 | 8/1996 | Counts et al. | 297/354.13 |
| 5,555,949 | 9/1996 | Stallard et al. | 180/6.5 |
| 5,575,348 | 11/1996 | Goertzen et al. | 180/65.6 |
| 5,592,997 | 1/1997 | Ball | 180/65.1 |

OTHER PUBLICATIONS

Advertisement for "EZ Tilt—Fixed Position Recliner" by Falcon.

Brochure titled "Positioning Redefined. Tarsys Tilt and Recline System for Action Storm." (Genus Medical Inc.).

Brochure titled "LaBac Systems; Tilt Seating Systems—Power Base Wheelchairs" (LaBac Systems).

Brochure titled "4XP; An innovative new line of seating systems from the makers of Tarsys" (Genus Medical Inc.).

Brochure titled "Vectors Mobility; We Look Different . . . Because We Are?" (Vector Mobility, Inc.).

Brochure titled "Introducing . . . The Tilt Master" (Mechanical Application Designs, Inc.).

*Primary Examiner*—Kevin Hurley

*Attorney, Agent, or Firm*—Arnold, White & Durkee

[57] ABSTRACT

The invention provides power seat tilting to a power wheelchair and comprises pivot means for converting a rear cross member of the seat frame into a pivot axle and a pair of rear support and bearing blocks for mounting over the base frame's side members for rotatably supporting the pivot axle. In one embodiment, a lower bracket is attached to a front cross member of the base frame for supporting the lower end of a power tilting mechanism. An upper bracket is attached to the front cross member of the seat frame for supporting the upper end of the power tilting mechanism for tilting the seat frame relative to the base frame. An electronic control module is mounted on the lower bracket underneath the seat.

16 Claims, 3 Drawing Sheets

POWER WHEELCHAIR WITH EXTENDED POWER SEAT FRAME TILT

BACKGROUND OF THE INVENTION

1. Field of the Invention

This invention relates in general to power wheelchairs and more particularly to such wheelchairs having extended power seat frame tilt capabilities.

2. Description of the Prior Art

A conventional battery-powered wheelchair, for example, Invacare Ranger X Storm Series (Model & Trademarks of Invacare Corp.), has a framework including a fixed suspension.

The framework comprises a base frame having horizontally arranged, spaced-apart, side square tubes and a front cross member. Over the base frame is suspended a cylindrical tubular seat frame which is made up of side members and of front and rear cross members.

This seat frame supports a dismountable seat structure which includes a seat pan that supports a seat, armrests, a back, footrests and sometimes a headrest.

Before delivering the power wheelchair to the end user, the dealer can preadjust the seat frame's tilt within a limited range, typically it is adjusted to about 5°.

For many users, the above described power wheelchair is all they desire or can afford. To others, the wheelchair may become uncomfortable for lack of extended power seat tilting. Such tilting may become needed following a sustained injury or disease, or for purely personal rather than clinical reasons.

Regardless of motivation, however, the prior art could provide power seat frame tilting only by (1) removing the seat structure together with the seat frame on which it is mounted, and (2) by replacing it with a new seat structure together with a new seat frame that can become attached to the original manufacturer's framework by bolts driven through the already existing holes therein.

Providing extended power seat frame tilting in this manner is very expensive (the replacing new seat frame together with the new seat structure may cost as much as the original wheelchair), and is very wasteful because the seat frame (and even the seat structure thereon), that originally came with the new power wheelchair, are not being utilized in the process of providing the desired extended power seat tilting.

This wasteful practice is believed to have been caused by existing and/or perceived limitations regarding: the available space under the seat frame, lack of a sufficient number of holes in the existing framework, prohibition by the wheelchair manufacturer against drilling new holes in its framework, concern about limited seat to ground clearance, and lack of suitable pivot points.

It is therefore a main object of this invention to provide an existing power wheelchair with extended power seat frame tilting, which is relatively inexpensive primarily because the seat frame and the seat structure thereon (that originally came with the new power wheelchair) are utilized in the new process for providing the desired extended power seat tilting capabilities.

It is another object to provide a new kit which has relatively few parts. It is simple, practical, compact, light weight, strong, reusable, relatively inexpensive to manufacture, easy to install using existing holes on the wheelchair's framework, and offers minimum interference with existing wheelchair instruments under the seat frame.

It is a further object to provide a new wheelchair framework suspension using the new kit. Before delivering a power wheelchair to the user, the dealer can remove the existing suspension and install the new kit on the existing framework using only existing holes therein.

It is yet another object to provide a new power wheelchair which incorporates the new suspension within its framework, thereby providing it with extended power seat frame tilting. The original seat frame is modified and the seat structure thereon is utilized, thereby avoiding unnecessary and very costly waste.

SUMMARY OF THE INVENTION

These and other objects are achieved in part by providing a new suspension to an existing wheelchair's framework. This new suspension replaces the original suspension. Whereas the original suspension's main role was to provide fixed support to the seat frame and the seat structure thereon, the new suspension additionally provides pivotal support to the seat frame and the seat structure thereon.

The new suspension uses support/pivot means on the base frame and complementary pivot means on a structural member of the original seat frame. With this new suspension, the lower end of a power actuator can be mounted on a lower bracket coupled to the front cross member of the base frame, and its upper end can be mounted on an upper bracket coupled to the front cross member of the seat frame.

The novel kit of this invention includes pivot means for converting the fixed rear end suspension into a pivotable rear end suspension. In one embodiment, the kit provides left and right side pivots for use on an existing rear cross member of the seat frame so that the selected cross member can serve as a pivot axle for the seat frame and rotate on a pair of rear support/bearing blocks mounted over the base frame's side members. The existing electronic control module is mounted on the lower bracket underneath the seat frame.

When the actuator receives power from the existing wheelchair's battery through the kits' control toggle switch, it extends/contracts its shaft in steps, thereby applying tilting forces to the front end of the seat frame which cause it to pivot in opposite angular directions relative to the stationary base frame.

DESCRIPTION OF PREFERRED EMBODIMENTS

Figure 1:
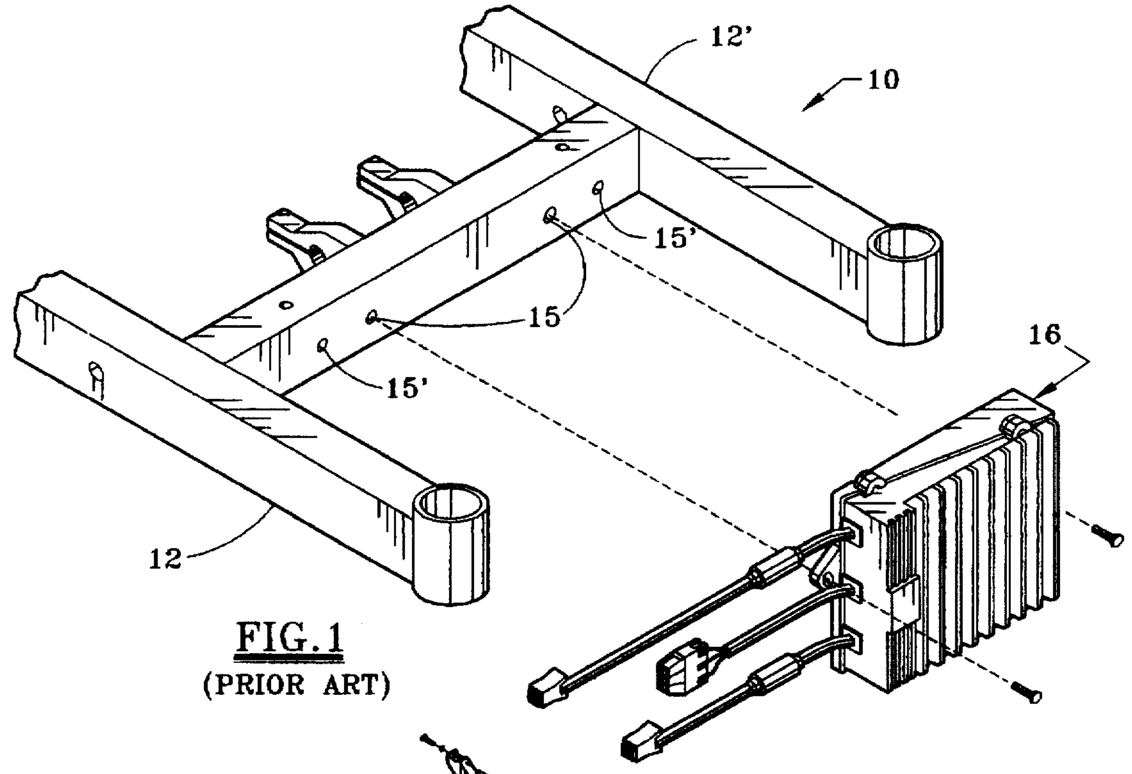
FIG. 1 (PRIOR ART)
FIGS. 1 and 2 are exploded views of a typical prior art power wheelchair framework and its suspension showing the base frame, the seat frame, and the electronic module.
Figure 2:
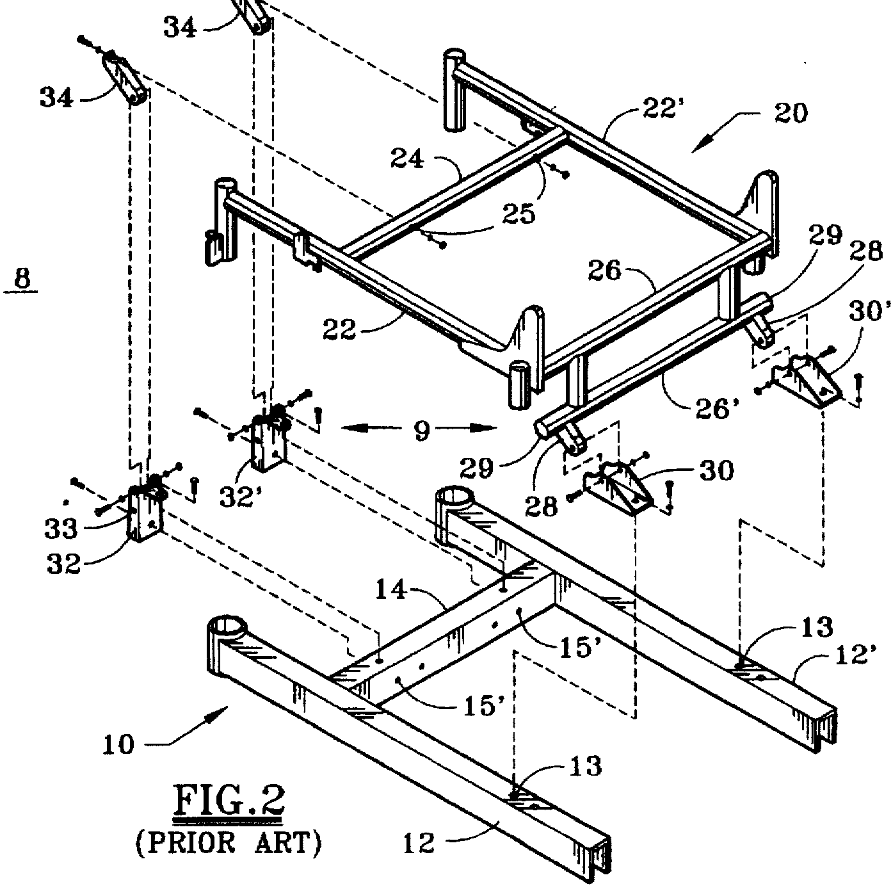
FIG. 2 (PRIOR ART)

The invention will be better understood from the following description with reference to FIGS. 1 and 2 which show a power wheelchair framework, generally designated as 8, such as is included in a popular power wheelchair sold by Invacare Corporation under its model/trademark Ranger X Storm Series.

Framework 8 includes a base frame 10 (FIG. 1) having horizontally-arranged, spaced-apart, square tubular side frame members 12,12' having holes 13, a front tubular cross member 14 having one pair of spaced apart holes 15 for removably accepting the bolts that secure an electronic control module 16 to cross member 14, and another pair of spaced apart holes 15'.

Figure 4:
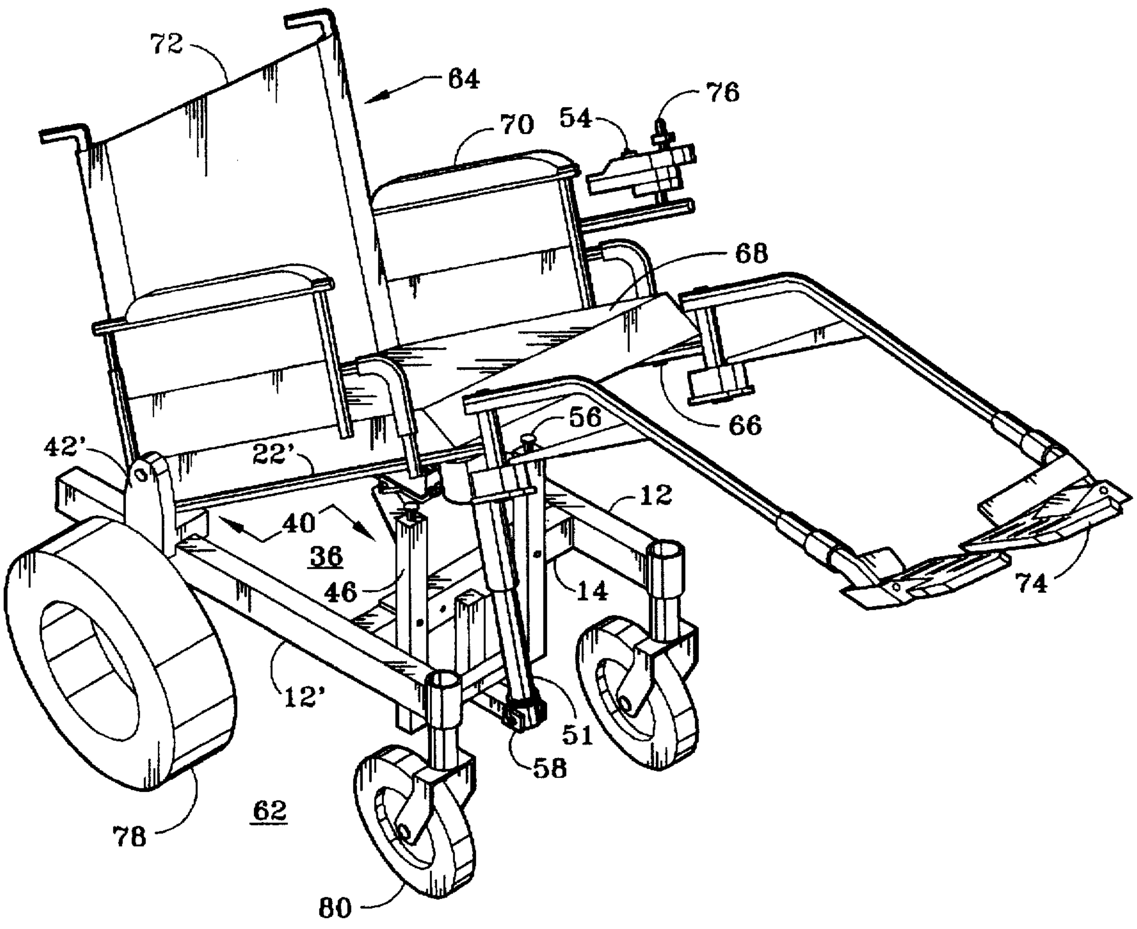
FIG. 4 is a perspective view of the novel wheelchair whose framework is shown in FIGS. 1 and 2 but which is modified to incorporate the kit of this invention, thereby providing the desired wheelchair with extended power seat frame tilting.

Framework 8 has a suspension, generally designated as 9 (FIG. 2), that suspends over base frame 10 a seat frame, generally-designated as 20, that supports a dismountable seat structure shown in FIG. 4, which includes a seat pan that supports a cushion seat, armrests, a back, and footrests.

Seat frame 20 is made up of horizontally-arranged, spaced-apart, cylindrical side members 22,22', which are linked to a cylindrical front cross member 24 having holes 25, and to a cylindrical rear cross cylindrical member 26 having a dependent cross member 26', which has at each end thereof a plastic plug 29 to prevent moisture accumulation therein, and which carries a pair of horizontally spaced ears or tabs 28.

A pair of rear seat support brackets 30,30' are bolted to the rear ends of base frame's side members 12,12' through holes 13. Ears 28 become pivotably connected to rear brackets 30,30', respectively.

A pair of front seat support brackets 32,32' are bolted, through the spaced apart holes 15', to the base frame's cross member 14. Brackets 32,32' have vertically spaced height adjustment holes 33.

The lower ends of a pair of links 34 are removably and adjustably received within holes 33 in seat brackets 32,32'. The upper ends of links 34 are bolted to seat frame's front cross member 24 through its spaced-apart holes 25.

The angle of seat frame tilting is preadjusted by the manufacturer or its dealer by raising or lowering both links 34 within their mating front support bracket 32,32' together with their connecting pins that extend through the vertically spaced-holes 33. The standard preadjustment fixed tilt angle for seat frame 20 is about 5° which makes the standard seat to floor dimension about 17.5 inches.

Thus, rear seat brackets 30,30', front seat brackets 32,32', rear cross member 26 and its dependent cross member 26', and adjustment links 34 together form the existing seat suspension 9 which fixedly suspends seat frame 20 over base frame 10.

General Description of the Invention

Figure 3:
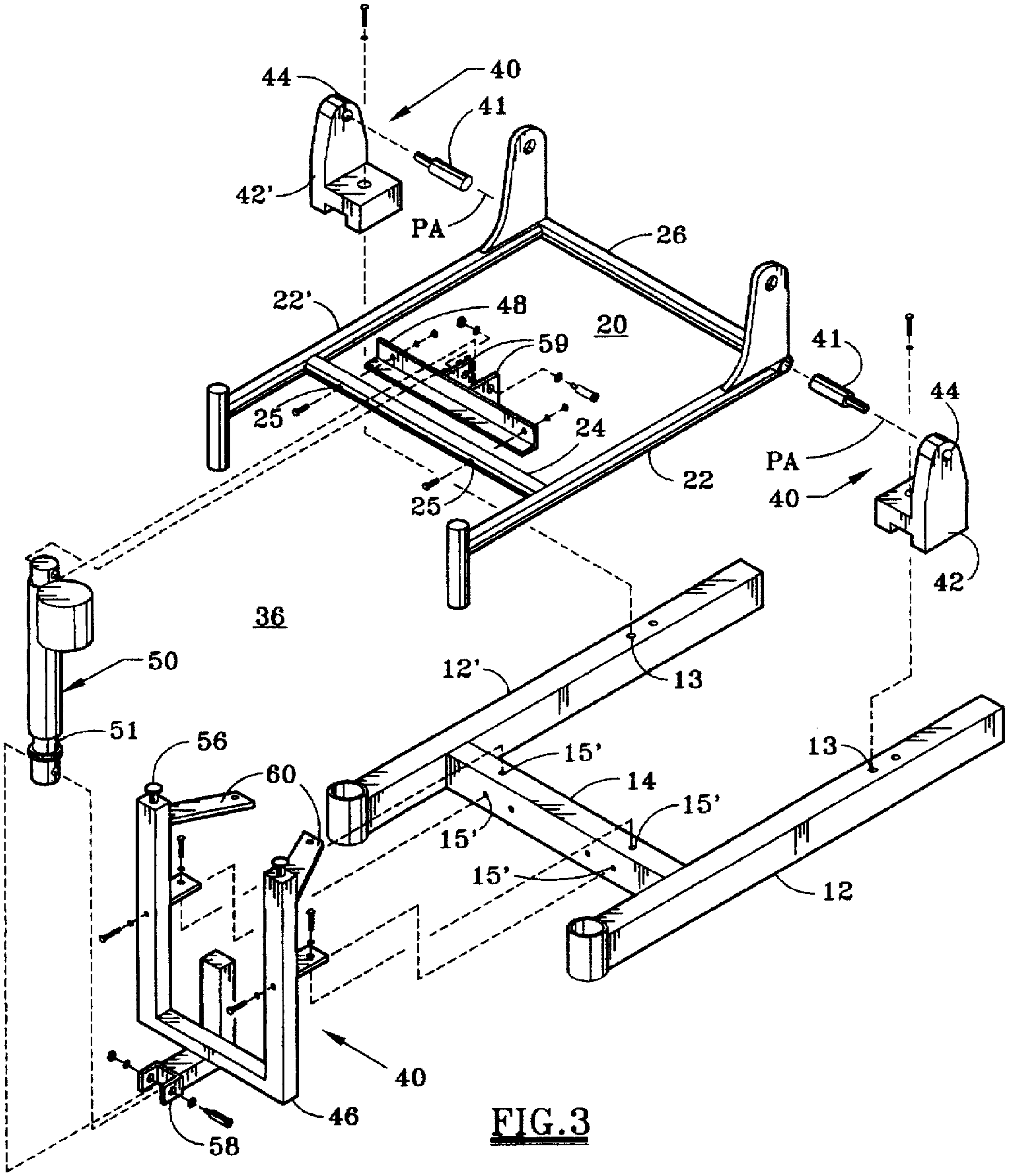
FIG. 3 is an exploded view of the parts which make up the kit of this invention, with the parts being shown in position for installation on the existing framework shown in FIGS. 1 and 2. The kit's parts are installed using existing holes on the framework. The existing seat frame in modified form is utilized in the new process of providing the desired extended power seat tilting.

In part, this invention provides a new suspension 36 (FIG. 3) for the existing wheelchair's framework 8 (FIGS. 1, 2).

This new suspension 36 replaces the original suspension 9, which is limited to providing only a fixed support for seat frame 20. The new suspension 36 offers a tiltable pivotal support to seat frame 20 by using an existing structural member of seat frame 20. In one embodiment, this existing member can be rear cylindrical cross member 26 or its dependent cylindrical cross member 26'.

Figure 5:
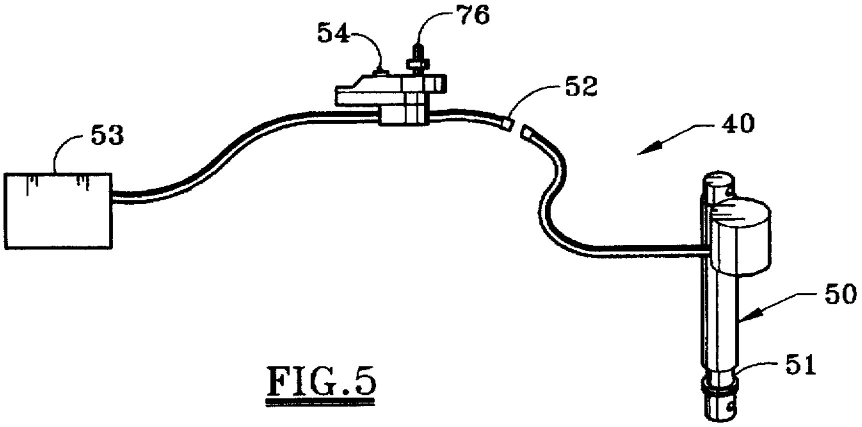
FIG. 5 is a schematic electric circuit diagram of the connections between the actuator, the toggle switch, and the existing power source on the wheelchair.

The new suspension 36 also uses a novel kit 40 which includes pivot means 41 for use with rear cross member 26 (FIG. 3) so that the pivot means 41 and cross member 26 together form a pivot axle PA for seat frame 20 to rotate about on a pair of rear support/bearing blocks 42,42' mounted over the base frame's side members 12,12'. With this new suspension 36, a power actuator 50 can be mounted between a lower bracket 46 and an upper bracket 48 to provide extended power seat frame tilting (FIGS. 3, 4, 5) to the standard power wheelchair, without replacing the manufacturer's seat frame 20, as is presently the prevailing practice.

In addition to pivots 41, support/bearing blocks 42,42', lower and upper actuator brackets 46,48, and power actuator 50, the novel kit 40 also includes a toggle switch 54 (FIG. 5), a power supply harness 52, and bottom seat frame stops 56.

Detailed Description of the Method of Using Kit 40

Using kit 40 requires first disconnecting from framework 8 (FIGS. 1, 2) the seat frame's existing suspension 9 and other parts that may be attached to either base frame 10 and/or seat frame 20.

Removing seat frame suspension 9 involves disconnecting a) rear seat support brackets 30,30' from base frame's side members 12,12' and from pivot lugs 28 on rear seat cross member 26', b) front seat support brackets 32,32' from base frame's front cross member 14, c) upper ends of links 34 from seat frame's front cross member 24, and d) electronic control module 16 from base frame's front cross member 14.

Connecting kit 40 to framework 8 requires snugly inserting a pivot 41 into each end of rear cross member 26, positioning support/bearing blocks 42,42', each carrying on its inner face a self-lubricating bearing 44, over base frame's side members 12,12' opposite to pivots 41, and sliding each bearing 44 over its mating pivot 41, connecting blocks 42,42' to base frame's side members 12,12' by driving bolts through existing holes 13, connecting lower actuator-support bracket 46 to the front face of base frame's cross member 14 by driving bolts through existing holes 15', connecting upper actuator bracket 48 to the rear side of seat frame's front cross member 24 by driving bolts through existing holes 25, pivotably connecting the lower end of actuator 50 to mount tabs 58 on lower bracket 46, pivotably connecting the upper end of actuator 50 to mount tabs 59 on upper bracket 48, connecting existing controller module 16 to tabs 60 on bracket 46 underneath seat frame 20, adjusting limit switches (not shown) within the actuator's housing so that its shaft 51 can extend a distance sufficient to tilt seat frame 20 by the desired angular range, say up to 40°, interconnecting power supply harness 52 with battery 53, toggle switch 54, and the motor of actuator 50, and inserting threaded bottom frame stops 56 to make contact with seat frame 20 when shaft 51 of actuator 50 becomes fully contracted, so as allow the frame stops 56 to support the full weight of the wheelchair's user.

Detailed Description of the Suspension 36

The novel suspension 36 includes: cross member 26 (FIGS. 3–4) having a pivot 41 at each end thereof, support/ bearing blocks 42,42' bolted to the rear ends of base frame's side members 12,12' through holes 13, each block carrying on its inner face a self-lubricating bearing 44 in which is journaled a pivot 41, lower actuator bracket 46 connected to the front face of base frame's cross member 14 through holes 15', and upper actuator bracket 48 connected to the rear face of seat frame's front cross member 24 through holes 25.

Since cross member 26 has a pivot 41 at each end thereof, it serves as pivot axle for seat frame 20 to rotate in opposite angular directions relative to stationary base frame 10 about pivot axis PA extending through both pivots 41.

Actuator 50 (FIGS. 3–5) is preferably a 24-volt DC, ball bearing, screw actuator available from Rayco International Corp. It is controlled by high-amp toggle switch 54 to provide a continuously adjustable seat frame tilt as the actuator's shaft 51 linearly moves in steps.

Because the lower end of actuator 50 is pivotably connected to mount tabs 58 on lower bracket 46 and its upper end is pivotably connected to mount tabs 59 on upper bracket 48, it can be easily installed or removed for repair without disturbing the wheelchair's framework. Also, electronic control module 16 can be connected to tabs 60 on lower bracket 46 underneath seat frame 20. In one embodiment, to so position electronic module 16 resulted in an increase of the seat to ground distance from 17.5" to 19.5".

The kit's harness 52 interconnects battery 53, toggle switch 54 and the motor of actuator 50.

General Description of Novel Wheelchair 62

As shown in FIG. 4, this invention also provides a novel wheelchair 62 which incorporates the novel suspension 36. The seat frame 20 is shown to support a conventional, dismountable seat structure 64 that includes a seat pan 66 supporting a seat 68, armrests 70, a back 72, and footrests 74. The wheelchair 62 also has the usual joystick 76, rear wheels 78 and front caster wheels 80. The toggle switch 54 is conveniently mounted next to joystick 76 or it can be incorporated therewithin.

In operation, by activating toggle switch 54 the motor of actuator 50 receives power from battery 53 causing shaft 51 to extend/contract in steps, thereby applying tilting forces to the front end of seat frame 20 which cause its rear end to pivot in opposite angular directions about pivot axis PA relative to stationary base frame 10, without disturbing electronic controller module 16 in its relocated position under seat frame 20.

It will be appreciated that this invention has overcome the perceived concern regarding the limited space under the seat frame, concern about limited seat to ground clearance, and concern regarding the lack of suitable pivot points.

The invention provides to the user of an existing power wheelchair the option of obtaining extended power seat frame tilting, which is relatively inexpensive primarily because the seat frame and the seat structure thereon that originally came with the new power wheelchair are utilized. This option can be obtained from using the novel kit 40. The dealer can easily remove the existing suspension and install the new kit on the existing framework. The original seat frame is slightly modified without affecting the utility assigned to it by the manufacturer. The kit itself is relatively simple, practical, compact, light weight, strong, and very easy to install using only existing holes on the wheelchair's framework.

Hence, the objects set out above are believed to have been accomplished, while other advantages and modifications will readily become apparent to those skilled in the art, without departing from the scope of this invention.

For example, each pivot 41 could extend inwardly from each inner side of rear mounting blocks 42,42', and each end of rear cross member 26 could accept a bearing therein for supporting its mating and opposite pivot 41.

What is claimed is:

1. A suspension for an existing power wheelchair's framework, said framework including a base frame and a seat frame, each of said base frame and seat frame comprising a front cross member, said seat frame further comprising a rear cross member, said suspension comprising:

support and pivot means coupled to said base frame and complementary pivot means coupled to a rear structural member of said seat frame;

brackets coupled to the front cross members of said base and seat frames; and power actuator means for tilting said seat frame relative to said base frame pivotably mounted on said brackets externally of said framework.

2. The suspension according to claim 1, and left and right side pivots coupled to the rear cross member of said seat frame so that it can serve both as pivot axle for said seat frame so that it can serve both as pivot axle for said seat frame and as a load bearing member thereof, thereby enabling said seat frame to pivot in opposite angular directions relative to said stationary base frame when said power actuator means applies pivoting forces to the front end of said seat frame.

3. The suspension according to claim 2, and a pair of rear support/bearing blocks mounted over said base frame's side members for rotatably supporting said left and right side pivots so that when said power actuator means extends/contracts its shaft in steps, said front end of said seat frame pivots relative to said base frame.

4. A system for providing power seat frame tilting to a battery-powered wheelchair including a framework having a base frame, a seat frame, and a suspension therebetween, rear wheels and front caster wheels mounted on said base frame, and said rear wheels being driven by electrically powered means using an electronic control module and a joystick, said system comprising:

first pivot means for allowing said seat frame to tilt relative to said base frame for coupling to a rear cross member of said seat frame;

a pair of rear support blocks for mounting over said base frame's side members for supporting the rear end of said seat frame, and said support blocks having second pivot means for mating with said first pivot means of said seat frame's cross member so as to enable said seat frame to rotate in opposite angular directions relative to a pivot axis extending through said seat frame's cross member;

a lower bracket adapted for attaching to the front end of said base frame for pivotably supporting the lower end of a power tiring mechanism; and an upper bracket adapted for attaching to the front end of said seat frame for pivotably supporting the upper end of said power tilting mechanism.

5. The system according to claim 4, wherein each of said support block has a bearing therein, and wherein said first pivot means of said seat frame's cross member comprises an outwardly extending pivot located at each end of said rear cross member, said outwardly extending pivot engaging an opposite bearing for rotation therein.

6. The system according to claim 5, further comprising a base frame having horizontally-arranged side members, and a front cross member; and a seat frame having horizontally-arranged side members, a front cross member, and a rear cross member which is provided with said first pivot means at each end thereof for functioning as a pivot axle;

said rear support blocks are mounted over said base frame's side members for rotatably supporting said pivot axle; and a power tilting mechanism tilting said seat frame on said pivot axle relative to said base frame.

7. The system according to claim 6, further comprising an electronic control module that is secured to said lower bracket underneath said seat frame.

8. The system according to claim 7, wherein said upper and lower brackets have means to pivotably support said power tilting mechanism as it forcibly pivots said rear end of said seat frame on said pivot axle.

9. The system according to claim 8, wherein said lower bracket is attached to said front cross member of said base frame; and said upper bracket is attached to said front cross member of said seat frame.

10. A power wheelchair framework having a front end and a rear end, comprising:

a base frame having side frame members and a front cross member;

a seat frame having side members, a front cross member, and a rear cross member forming integral part of said seat frame for detachably supporting a seat structure thereover;

a suspension for pivotably mounting said the rear end of seat frame over said base frame, said suspension including: said seat frame's rear cross member and a pair of rear support blocks mounted over said base frame's side members; and mating pivot means on said rear blocks and on said seat frame's rear cross member for pivotably supporting said rear end of said seat frame, and said pivot means including pivots and mating bearings.

11. The power wheel chair framework according to claim 10, and an electrically-operated extensible actuator, capable of extending and retracting; and means for pivotably coupling the opposite ends of said actuator between said base frame's front cross member and said seat frame's front cross member so that said seat frame can undergo extended tilting over a predetermined angular range as required by the user of said wheelchair.

12. A method of providing extended power tilting to a battery-powered wheelchair having a framework comprising a base frame, a seat frame, and a suspension therebetween without power seat tilting, rear wheels and front caster wheels mounted on said base frame, said rear wheels being driven by electrically powered means using an electronic control module and a joystick or the like, comprising the steps of:

using a seat frame's rear cross member as a pivot axle;

mounting a pair of rear support blocks over said base frame's side members for rotatably supporting said pivot axle;

attaching a lower bracket to said base frame's front end;

coupling an upper bracket to said seat frame's front end; and mounting a tilting mechanism on said brackets for tilting said seat frame on said pivot axle relative to said base frame.

13. The method according to claim 12, further comprising providing each support block with a bearing therein and providing each end of said rear cross member with an outwardly extending pivot engaging said beating for rotation therewithin.

14. The method according to claim 13, further comprising attaching said lower bracket to a from cross member of said base frame, and attaching said upper bracket to a front cross member of said seat frame.

15. The method according to claim 14, further comprising providing each one of said brackets with means for pivotably supporting said tilting mechanism.

16. The method according to claim 15 further comprising providing said base frame with horizontally-arranged side members, and a front cross member, and aid seat frame with horizontally-arranged side members, and front and rear cross members; and securing said module to said lower bracket underneath said seat frame.

* * * * *